July 11, 1933.  H. D. TAYLOR  1,917,342
BRAKE MECHANISM
Filed Sept. 21, 1931  3 Sheets-Sheet 1
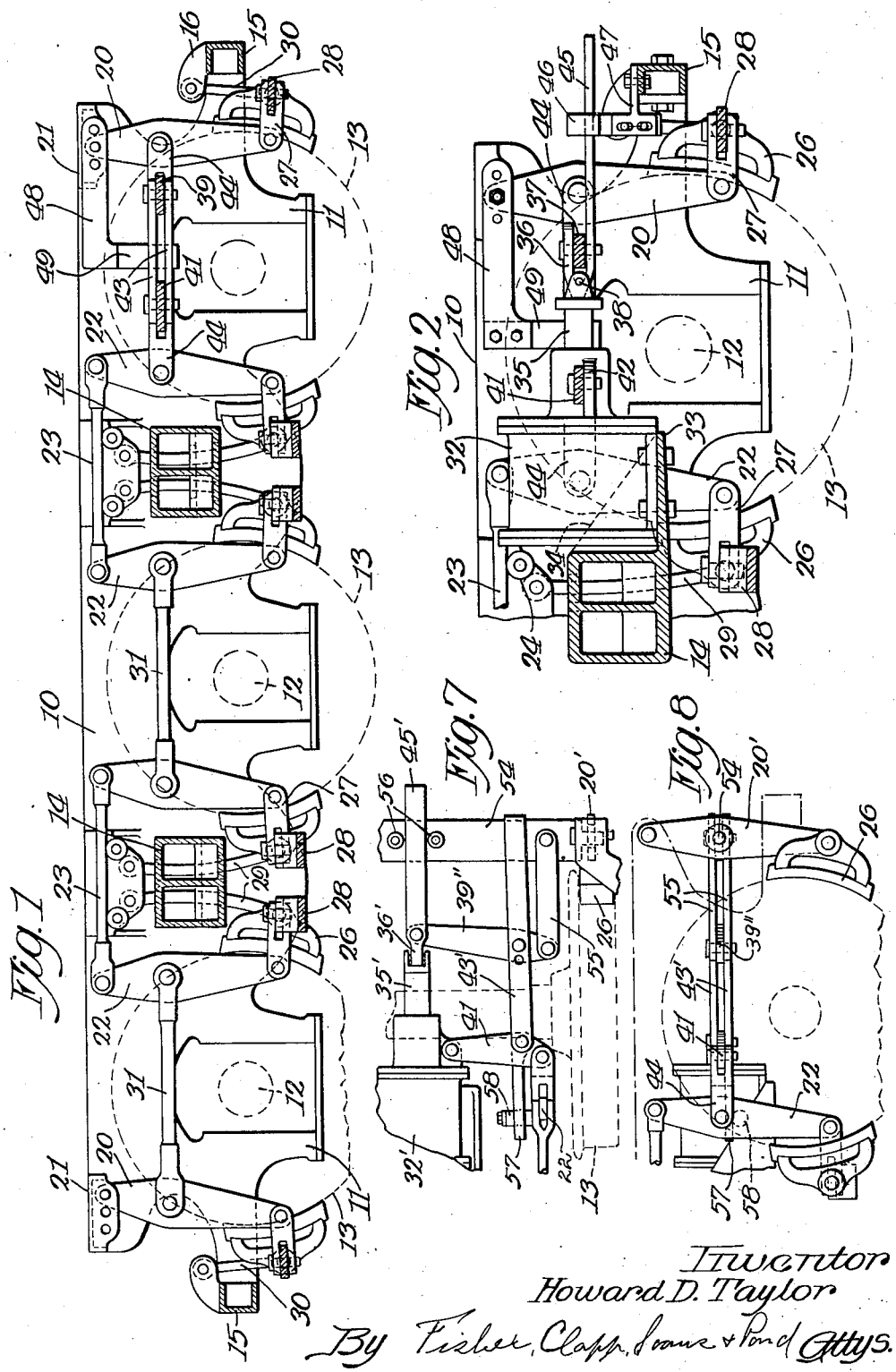
Inventor
Howard D. Taylor
By Fisher, Clapp, Soans & Pond Attys.

July 11, 1933.   H. D. TAYLOR   1,917,342
BRAKE MECHANISM
Filed Sept. 21, 1931   3 Sheets-Sheet 2

Inventor
Howard D. Taylor
By Fisher, Clapp, Soans & Paul Attys.

Inventor
Howard D. Taylor
By Fisher, Clapp, Soans & Pond Attys.

Patented July 11, 1933

1,917,342

UNITED STATES PATENT OFFICE

HOWARD D. TAYLOR, OF READING, PENNSYLVANIA, ASSIGNOR TO FLEXIBLE TRUCK CORPORATION, OF READING, PENNSYLVANIA, A CORPORATION OF DELAWARE

BRAKE MECHANISM

Application filed September 21, 1931. Serial No. 563,929.

The invention relates to brake mechanism for railway trucks and particularly to the operating mechanism for clasp brakes.

The invention seeks to provide an improved arrangement of the operating mechanism in which the air brake cylinders are mounted on the truck frame, and the invention consists in the features of improvement hereinafter set forth, illustrated in the preferred form in the accompanying drawings and more particularly pointed out in the appended claims.

Fig. 1 is a fragmentary sectional view of a car truck with the improved brake mechanism applied thereto, parts being shown in section on the line 1—1 of Fig. 3.

Fig. 2 is a detailed view in elevation of the operating means for the brake mechanism with parts shown in section on the line 2—2 of Fig. 3.

Figs. 7 and 8 are partial plan and side views showing a further modification.

Figure 3:
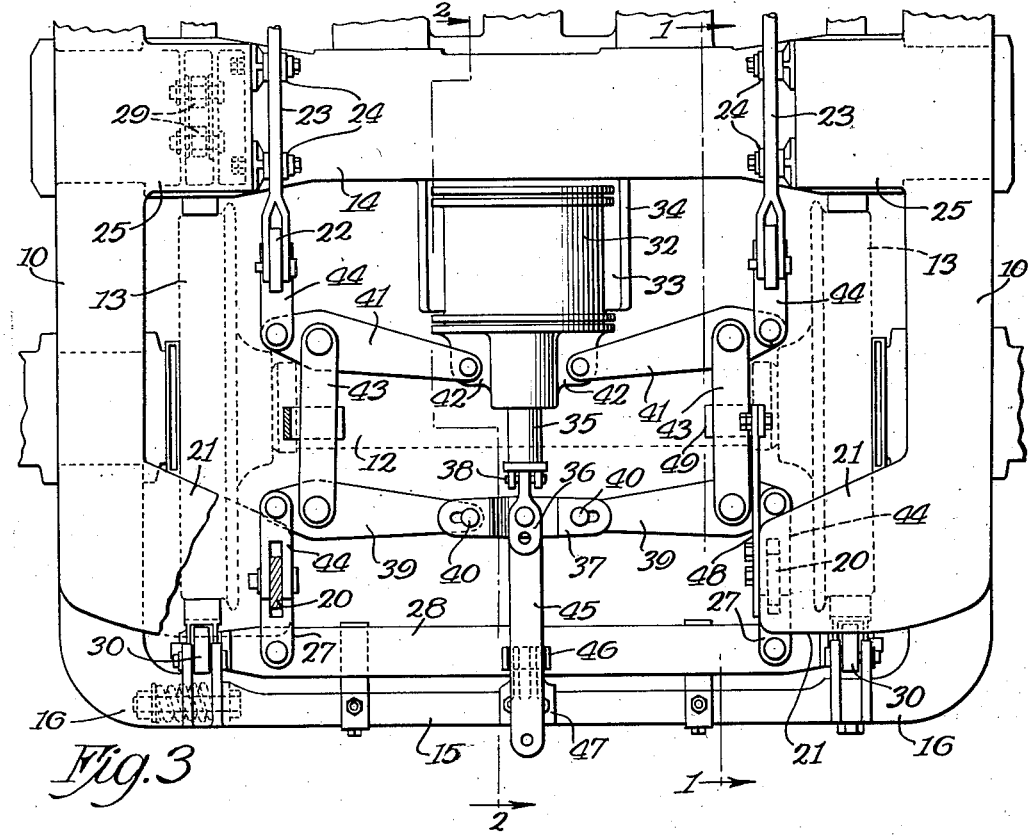
Fig. 3 is a plan view with parts broken away and other parts shown in section.
Figure 4:
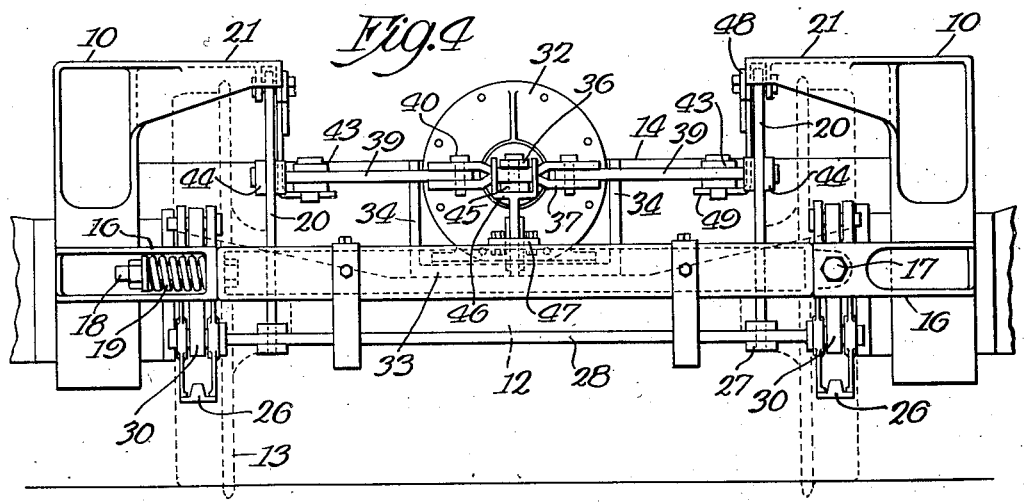
Fig. 4 is an end view.

The truck frame in the form shown comprises side members 10 having pedestal jaws 11 which receive the journal boxes of the axles 12 which carry the wheels 13. Intermediate the wheel axles, the side frames are connected by transverse members or bolsters 14. Also, in the forms shown, the side frames are connected at their ends by cross bars 15 which extend between inwardly extending offsets 16 on the ends of the side frames. Each bar, as shown in Fig. 4, is connected to one of the offsets 16 by a pivot pin 17 and at its other end it is flexibly connected to the adjacent offset 16 by a bolt 18 and spring 19.

The brake mechanism is of the clasp type and comprises a set of brake levers and pull rods at each side of the truck, a pair of brake levers being disposed on opposite sides of each wheel. In the form shown, the end brake levers 20 are pivotally mounted at their upper ends upon inwardly extending offsets 21 on the side frames. The intermediate brake levers 22 are floating levers and the adjacent pairs of floating levers are connected at their upper ends by pull rods 23 which are supported on guide rollers 24, the latter being carried on inwardly extending offsets 25 on the side frames.

The brake levers are connected at their lower ends to the brake heads 26 and in the form shown, the lower ends of the brake levers are connected by clevises 27 to brake beams 28 extending between the brake heads. Hangers are provided for the brake beams and heads, the intermediate hangers being pivoted to the offsets 25 of the side frames and the short end hangers 30 to ears on the offsets 16.

The pairs of brake levers on opposite sides of each wheel, except those at one end of the truck, are connected by pull rods 31 which extend over the wheel axles and are pivoted to the brake levers intermediate their ends. The pair of brake levers 20 and 22 at one end of the truck are connected by the brake operating mechanism. This comprises a brake cylinder 32 which is mounted on the central portion, and preferably on the outer side of the transverse connecting member or bolster 14 of the truck frame. For this purpose, one of the bolsters 14 is provided with a supporting ledge 33 which is preferably cast integral therewith and which extends from the lower central portion of the bolster toward one end of the truck, and upon which the brake cylinder 32 is mounted. Preferably, as shown, stiffening flanges 34 extend between the bolster and the ends of the shelf or support 33.

The cylinder piston rod 35 extends toward the adjacent end of the truck and is connected by a link or clevis 36 to the center of a horizontally disposed equalizer bar 37, the clevis being pivoted to the center of the equalizing bar and the piston being connected to the clevis, preferably by a horizontal pivot 38. A pair of horizontally disposed live and fulcrumed cylinder levers are arranged on each side of the piston rod. The live cylinder levers are connected to the ends of the equalizer bar 37 by pivot bolts 40 which preferably extend through slots formed in the equalizer bar. The dead or fulcrumed brake levers 41 are pivotally connected at their inner ends to supporting lugs 42 formed upon the outer head of the brake cylinder. The live and dead cylinder levers of each pair are connected intermediate their ends but adjacent their outer ends by a pair of pull rods or links 43, and the outer ends of the levers are connected by clevises 44 to the pairs of brake levers 20 and 22 at the adjacent end of the truck. These clevises are pivoted to the brake levers intermediate their ends and preferably, as shown, the live cylinder levers 39 are connected to the fulcrumed brake levers 20, and the fulcrumed cylinder levers 41 are connected to the floating brake levers 22. When the piston rod 39 is forced outwardly, the brakes are applied.

Supporting guides are provided for the cylinder levers and the parts connected thereto. In the arrangement shown, the shackle or link 36 connected to the equalizer bar 37 is provided with an extension 45 which projects over the end bar 15 and is engaged by a U-shaped guide bracket 46. The latter is provided with a stem which is preferably adjustably connected to a bracket 47 centrally fixed to the end bar 15. Straps 48 fixed to the offsets 21 on the side frames extend inwardly therefrom and L-shaped brackets 49 secured to the inner ends of these straps extend beneath and form supporting guides for the pull rods or links 43. These supporting guides serve to maintain the horizontally disposed equalizer bar and cylinder levers in proper position. Also, the extension 45 provides a connection for the hand brake operating means. It is also noted that by connecting the clevis or link 36 to the end of the piston rod by a horizontal pivot, the brake cylinder can have a limited vertical movement, and hence, if desired, the transverse member 14 upon which the brake cylinder is mounted may be spring-supported in the truck frame.

Figure 5:
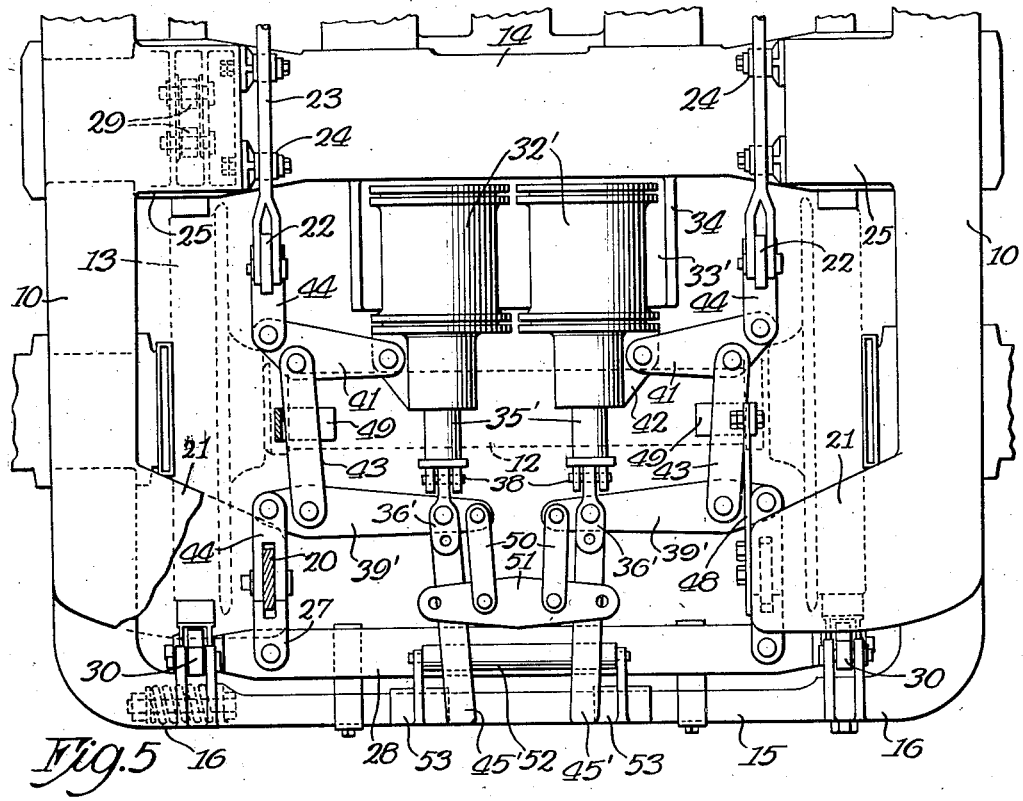
Figs. 5 and 6 are views similar to Figs. 3 and 4 illustrating a modification.
Figure 6:
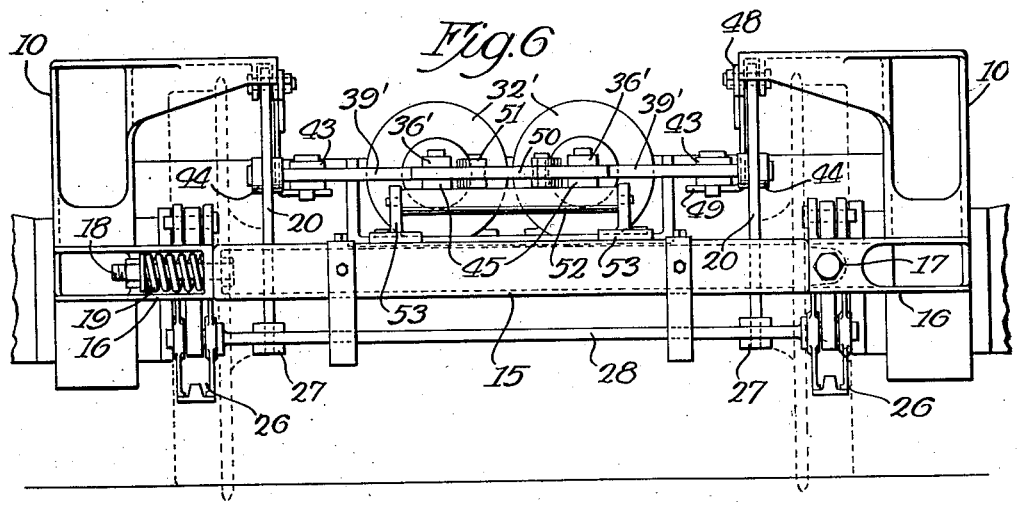

The form shown in Figs. 5 and 6 is similar in all respects to that shown in Figs. 1 to 4 inclusive except that separate air cylinders 32 are provided and the live cylinder levers 39' are directly connected at their inner ends by clevises 36' to the piston rods 35. Also, the inner ends of the live levers 39' are preferably extended beyond the clevises and are connected by links 50 to a transverse bar 51 which affords means for connecting the hand brake operating gear. Also, in this form, the extensions 45' of the clevises or links 36' extend over a supporting guide roller 52 which is journaled at its ends in brackets 53 mounted on the frame end bar 15. The supporting shelf 33' on the transverse frame member or bolster 14 is wider than that shown in Fig. 3 and the air cylinders are arranged side by side thereon. Each air cylinder serves to effect the operation of the brakes on one side of the truck. In the form shown in Figs. 7 and 8, the brake levers 20' are disposed in the plane of the car wheels and also serve as hangers for the brake heads, and the associated brake beam 54 extends between and is connected to the central portions of the brake levers 20'. With this arrangement, the live brake levers 39'' are connected by double links or pull rods 55 to the ends of the brake beam 54. Also, in this form, the extensions 45' of the clevis links 36' rest upon the brake beam 54 and are held in position thereon by vertically disposed guide rollers 56. The links or pull rods 43' also have extended end portions which rest upon the brake beam 54 and they are also provided with inwardly projecting extensions 57 which rest upon supporting brackets 58 fixed to the live brake levers 22.

The arrangement of the brake cylinder or cylinders and the pairs of substantially horizontal live and dead cylinder levers, arranged closely adjacent and on opposite sides of the cylinder piston rod or rods, is extremely compact and these operating parts are disposed below the upper portions of the truck frame, inside of its ends and out of the way well above the track. At the same time they are arranged closely adjacent one end of the truck frame and are readily accessible for repairs.

Changes may be made in the details set forth without departure from the scope of the invention as defined in the appended claims.

I claim as my invention:—

1. In a brake mechanism for railway trucks, the combination with the truck frame comprising side members, clasp brake levers thereon, and a transverse member disposed between two of the wheel axles, of a brake cylinder mounted on the central outer side portion of said transverse member and having a piston rod extending toward the adjacent end of the truck, and horizontally disposed live and dead cylinder levers arranged adjacent and on one side of the piston rod and connected respectively at their outer ends to the brake levers associated with one of the wheels at the adjacent end of the truck, said cylinder levers being connected together intermediate their ends with the live lever connected at its inner end to the piston rod and the dead lever having a fixed fulcrum at its inner end adjacent the outer end of the cylinder, substantially as described.

2. In a brake mechanism for railway trucks, the combination with the truck frame comprising side members, clasp brake levers thereon, and a transverse member disposed between two of the wheel axles, of a brake cylinder mounted on the central outer portion of said transverse member and having its piston rod extending toward the adjacent end of the truck, and means for operating the brake levers at one side of the truck comprising substantially horizontally live and dead levers adjacent and on one side of the piston rod and connected at their outer ends to the brake levers of one of the wheels at the adjacent end of the truck, the live lever being connected at its inner end to the piston rod and the dead lever having a fixed fulcrum at its inner end adjacent the outer end of the cylinder, a pull rod connecting said levers intermediate their ends, and a supporting guide for said pull rod substantially as described.

3. In a brake mechanism for railway trucks, the combination with the truck frame comprising side members, clasp brake levers thereon, and a transverse member disposed between two of the wheel axles, of a brake cylinder mounted on the central outer side portion of said transverse member with its piston rod extending toward one end of the truck, a horizontal equalizer bar connected to the piston rod, and two pairs of substantially horizontal live and fulcrumed cylinder levers adjacent and on opposite sides of the piston rod and operatively connected to said equalizer bar, and connected respectively to the brake levers of one wheel at the adjacent end of the truck, substantially as described.

4. In brake mechanism for railway trucks, the combination with side frames, clasp brake levers mounted thereon, and a transverse connecting member, of a brake cylinder mounted on said transverse member, an equalizer bar, pairs of live and fulcrumed cylinder levers operatively connected to said equalizer bar with the levers of each pair connected at their outer ends to the brake levers of one of the wheels at the adjacent end of the truck, said bar and cylinder levers being horizontally disposed, a link connecting said equalizer bar and the cylinder piston rod, pull rods connecting the cylinder levers of each pair, and supporting guides for said link and said pull rods, substantially as described.

5. In a brake mechanism for railway trucks, the combination with the truck frame comprising side members, clasp brake levers thereon, and a transverse member disposed between two of the wheel axles, of means for operating the brake levers at each side of the truck comprising an independent cylinder and connected live and fulcrumed cylinder levers operatively connected to the cylinder piston rod, extending laterally and outwardly therefrom and connected respectively at their outer ends to the brake levers of one of the truck wheels, substantially as described.

6. In a brake mechanism for railway trucks, the combination with the truck frame comprising side members, clasp brake levers thereon, and a transverse member disposed between two of the wheel axles, of a pair of brake cylinders mounted on said transverse member and having piston rods extending toward one end of the truck, a pair of horizontally disposed live and dead levers associated with each cylinder, the dead lever having a fixed fulcrum at its inner end and the live lever being connected at its inner end to the cylinder piston rod, and a pull rod connecting said levers intermediate their ends, said live and dead levers being connected to the brake levers at the outer and inner sides respectively of one of the wheels at the adjacent end of the truck, substantially as described.

7. In brake mechanism for railway trucks, the combination with side frames, brake levers mounted thereon and a transverse connecting member, of a brake cylinder mounted on said transverse member, dead and live cylinder levers adjacent and on one side of the cylinder piston rod, extending laterally therefrom and connected at their outer ends to the brake levers on one of the truck wheels, a link connecting the inner end of the live lever to the piston rod, a pull rod connecting the cylinder levers intermediate their ends, and guide brackets for supporting said link and pull rod, substantially as described.

8. In brake mechanism for railway trucks, the combination with side frames, brake levers mounted thereon and a transverse connecting member, of a brake cylinder mounted on said transverse member, dead and live cylinder levers adjacent and on one side of the cylinder piston rod, extending laterally therefrom and connected at their outer ends to the brake levers on one of the truck wheels, a link vertically pivoted to the inner end of the live lever and horizontally pivoted to the piston rod, said link having an extension and a supporting guide for said extension, substantially as described.

9. In brake mechanism for railway trucks, the combination with side frames, clasp brake members mounted thereon and a transverse connecting member disposed between two of the wheel axles, of a brake cylinder mounted on the outer central portion of said transverse member with its piston rod extending toward one end of the truck, an equalizer bar, pairs of live and fulcrumed cylinder levers operatively connected to the equalizer bar, with the levers of each pair connected at their outer ends to the brake levers of one of the wheels at the adjacent end of the truck, said equalizer bar and cylinder levers being substantially horizontally disposed and the levers being arranged adjacent and on opposite sides of the cylinder piston rod, a link connecting the equalizer bar and the piston rod, pull rods connecting the cylinder levers to each pair intermediate their ends, and guide brackets on the truck frame engaging said link and said pull rods, substantially as described.

HOWARD D. TAYLOR.